Oct. 26, 1937.  H. B. CLAUS  2,096,957
FISHHOOK
Filed June 13, 1936
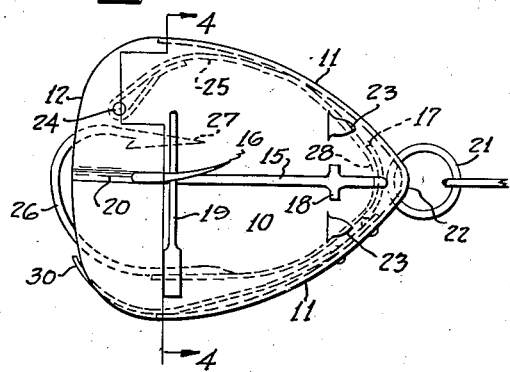
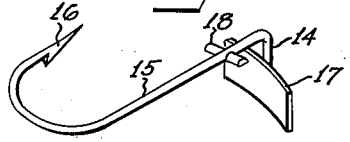
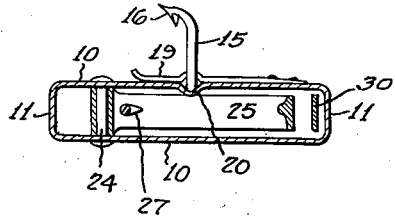
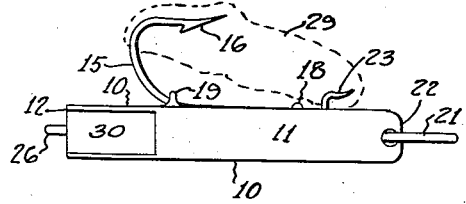
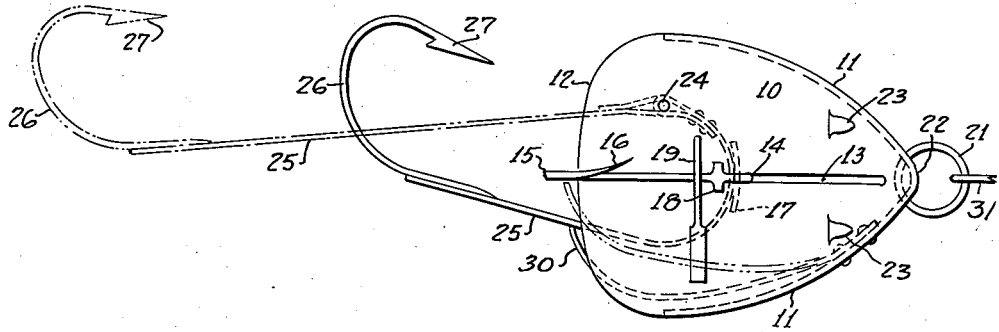
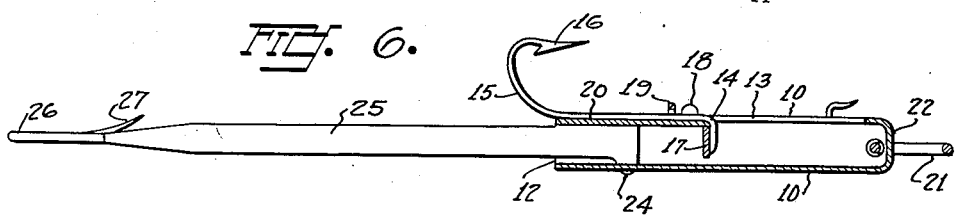
INVENTOR
H. B. CLAUS
BY
ATTORNEY Patented Oct. 26, 1937

2,096,957

UNITED STATES PATENT OFFICE 2,096,957

FISHHOOK

Herman B. Claus, Otis, Oreg.

Application June 13, 1936, Serial No. 85,100

4 Claims. (Cl. 43—34)

This invention relates generally to fishing apparatus, and particularly to a fishing hook.

The main object of this invention is to prevent the fish from escaping after being caught on a hook.

The second object is to so construct the hook that it will catch the fish farther back in the mouth than is ordinarily possible.

The third object is the construction of a fishhook which can be used in conjunction with a plug.

The fourth object is to make an extensible hook which will shoot out automatically when the fish bites.

The fifth object is to construct a hook of the class described which is as easy to bait as a common hook.

The sixth object is to construct a hook of the class described which can be used singly or in multiple.

The seventh object is to construct a hook which is easy to manufacture, simple to operate, and not readily made inoperative.

I accomplish these and other objects in the manner set forth in the following specification as illustrated in the accompanying drawing, in which:

Fig. 1 is a plan of the device showing the hook in a contracted position.

Fig. 2 is a side elevation of the device.

Fig. 3 is a perspective view of the actuating hook.

Fig. 4 is a section taken along the line 4—4 in Fig. 1.

Fig. 5 is a view similar to Fig. 1 but showing the extendible hook in a partially extended position in full lines and a fully extended position in dotted lines.

Fig. 6 is a longitudinal section through the device showing the extendible hook in its outermost position.

Similar numerals refer to similar parts throughout the several views.

Referring in detail to the drawing, there is shown a casing consisting of two flat sides 10 which are joined by the curved edges 11 leaving the edge 12 open. One side 10 is provided with a slot 13 into which extends the bent shank 14 of the actuating hook 15 whose point 16 is similar to that of a conventional fishhook. The shank 14 is provided with a shoe 17 which is slightly curved, but is capable of being introduced through the slot 13. A cross bar 18 intersects the actuating hook 15 and forms a slide in conjunction with the guiding slot 13. The spring 19 serves to keep the hook 15 in the groove 20 formed by bending the metal in the side 10 in prolongation of the slot 13. A ring 21 is attached to the end 22 for the purpose of fastening the fishline. It is desirable to provide a pair of bait retaining barbs 23 in the side 10 near the end 22.

Disposed across the space between the sides 10 and near the edge 12 on one side of the medial line is a pin 24 to which is attached a flexible resilient band 25 preferably in the form of a steel tape of arcuate cross section. To the band 25 is secured the extendible fishhook 26 whose point 27 is normally concealed between the sides 10 when the hook is set, that is, in the position shown in Fig. 1, in which the portion 28 of the band 25 is near the end 22 and is in engagement with the shoe 17. It will be noted that in this position the band 25 is compressed into a somewhat heart-shaped form between the edges 11, and the hook 26 will remain at rest until the band 25 is caused to move outwardly, that is, toward the edge 12.

Assuming now that bait 29 is placed on the hook 16 and fully supported thereby or partly supported by the barbs 23 and a fish attempts to take the bait 29, it can be seen that any pull exerted on the hook 15 will cause the shoe 17 to push against the portion 28 of the band 25 and expel the hook 26 to a point where the spring in the band 25 will cause same to shoot outwardly, carrying with it the hook 26, causing it to move to a point farther down the throat of the fish and insuring against its escape which is often the case when fish nibble a hook and are caught only on the tender and less strong parts of the mouth.

It must be understood that the barbs 23, while convenient, are not absolutely essential except with certain kinds of bait, and they may be placed on the sides 10 or on the hook 15 itself near its shank 14. It must also be understood that while I have illustrated the device with single hooks 15 and 26, the double hook may be employed or both of the sides 10 may be slotted and a hook 15 be placed therein without departing from the spirit of this invention.

The device also lends itself to incorporation in plugs which afford excellent concealment for the extendible hook members. It is desirable to provide a resilient guide 30 for the band 25 which tends to guide the hook 26 substantially along the longitudinal axis of the device, that is, in parallelism with the line 31 to which the device is attached.

It must be understood that the groove 20 is not absolutely essential and in some cases, it will be formed by raising a pair of ridges on the outside of the casing in order not to project into the casing, it being desirable to have the band 25 substantially as wide as the interior of the casing. The spaces shown between the band 25 and the casing are exaggerated merely for the purpose of clearness.

I claim:

1. In a device of the class described the combination of an extendible fishhook having a resilient connector attached thereto, a hollow holder into which said connector may be stowed together with said hook, said connector being attached to said holder, said holder being so shaped that when the hook is partly expelled it becomes released and is fully expelled by the resiliency of said connector, and a bait carrying hook having a shoe thereon adapted to engage said connector and produce the first portion of the expelling movement when a pull is exerted against the bait on said bait carrying hook.

2. In a device of the class described the combination of an extendible hook having a housing in which said hook may be stored and having a resilient connector for attaching said hook to said housing, a bait carrying hook slidably mounted in said housing having a shoe extending into said housing engaging said connector and means for guiding said first mentioned hook in the general direction of the continuation of a fish line which is attached to said housing.

3. In a device of the class described the combination of a housing having a pocket formed therein, a resilient band secured to said housing and adapted to be stored within said pocket, an extendible hook attached to said band normally stored within said pocket, said housing having a longitudinal slot formed through the side thereof, a bait carrying hook slidably mounted in said slot having its barb on the outside of said housing and having a shoe on the inside of said housing adapted to engage said resilient member and means for holding said bait carrying hook in position with relation to said slot and adapted to permit said bait carrying hook to slide longitudinally and cause said shoe to expel said extendible hook.

4. In a device of the class described the combination of a housing consisting of a pair of parallel plates spaced from each other and having a rounded end at one end and a somewhat flat rounded end at the other, said rounded end and the adjacent sides being closed and the opposite end being open, means for attaching a fish line to said rounded end, a shoe slidably mounted between said plates, a bait carrying hook on the outside of said housing attached to said shoe and a resilient steel band attached to said housing and adapted to be coiled between said plates having a hook secured to the unattached end thereof, said coiled band engaging said shoe, one of said plates having a slot therein through which said bait carrying hook is connected to said shoe and means for guiding said bait carrying hook longitudinally within said slot and for holding said bait carrying hook in a plane normal to its adjacent plate.

HERMAN B. CLAUS.